United States Patent
Liang et al.

(10) Patent No.: US 8,684,422 B2
(45) Date of Patent: Apr. 1, 2014

(54) FIXING MECHANISM FOR FIXING A COMPONENT

(75) Inventors: Chen-Yi Liang, New Taipei (TW);
Chun-Chien Chen, New Taipei (TW);
Cheng-Hsiang Chuang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 299 days.

(21) Appl. No.: 13/174,783

(22) Filed: Jul. 1, 2011

(65) Prior Publication Data
US 2012/0242093 A1 Sep. 27, 2012

(30) Foreign Application Priority Data
Mar. 25, 2011 (TW) .............................. 100110304 A

(51) Int. Cl.
*E05C 19/06* (2006.01)
*E05C 19/00* (2006.01)

(52) U.S. Cl.
USPC .......................... 292/80; 292/87; 292/DIG. 38

(58) Field of Classification Search
USPC ........................................ 292/80, 87, DIG. 38
See application file for complete search history.

(56) References Cited

U.S. PATENT DOCUMENTS

| | | | | |
|---|---|---|---|---|
| 2,986,791 A | * | 6/1961 | Strehlein | 24/669 |
| 4,550,230 A | * | 10/1985 | Johnson | 181/199 |
| 5,348,356 A | * | 9/1994 | Moulton | 292/80 |
| 6,796,760 B1 | * | 9/2004 | Tanner | 411/107 |
| 7,178,855 B2 | * | 2/2007 | Catron et al. | 296/146.7 |
| 7,189,043 B2 | * | 3/2007 | Benoit et al. | 411/104 |
| 7,954,205 B2 | * | 6/2011 | Xueyong et al. | 24/289 |
| 2007/0107174 A1 | * | 5/2007 | Bordas | 24/664 |

FOREIGN PATENT DOCUMENTS

| | | |
|---|---|---|
| CN | 201229524 Y | 4/2009 |
| TW | M346048 | 12/2008 |
| TW | 201042424 | 12/2010 |

OTHER PUBLICATIONS

Office action mailed on Feb. 23, 2013 for the Taiwan application No. 100110304, filing date: Mar. 25, 2011, p. 1 line 12-14 and p. 2 line 1-16.
Office action mailed on Jan. 6, 2014 for the China application No. 201110087332.4, p. 3 line 4-27, 29-30, p. 4 line 2-4, 6-7, 10-13, 15-19, 22-23, 26-27, 30, and p. 5 line 1.

* cited by examiner

*Primary Examiner* — Carlos Lugo
(74) *Attorney, Agent, or Firm* — Winston Hsu; Scott Margo

(57) ABSTRACT

The disclosure relates to a fixing mechanism for fixing a component. The fixing mechanism includes a base, a bottom wall disposed on the base, and two lateral walls disposed on the base and connected to the bottom wall. A containing space is formed between the base, the bottom wall, and the two lateral walls. The fixing mechanism further includes a hook. The hook includes a cantilever portion and a hooking portion. The cantilever portion is connected to the bottom wall and for pressing against the component when the component is contained inside the containing space. The hooking portion is connected to the cantilever portion and engages with a lateral surface of the component when the component is contained inside the containing space. The fixing mechanism further includes two engaging parts for laterally engaging against the component when the component is contained inside the containing space.

7 Claims, 6 Drawing Sheets

FIXING MECHANISM FOR FIXING A COMPONENT

BACKGROUND OF THE INVENTION

1. Field of the Invention

The disclosure relates to a fixing mechanism for fixing a component, and more particularly, to a fixing mechanism for assembling a component in a direction different from a loosing direction of a hook thereof.

2. Description of the Related Art

Generally speaking, when a notebook computer is close, a latch mechanism is used for latching a monitor and a host in order to fix the monitor and the host. For example, a conventional latch mechanism utilizes a magnetic component to combine the monitor and the host. The magnetic component is often fastened by glue or hooks. It has disadvantages of overflow of glue, high cost, and viscosity reduction of the glue due to temperature increase. Furthermore, the assembly direction of the conventional magnetic component is the same as the lift direction of the hook, so that the magnetic component compresses the hook backwards resulting in loss of function of fastening the magnetic component by the hook. On the other hand, for easy assembly of the magnetic component, the size of the hook can be reduced, but it causes possibility of loosing the magnetic component. Thus, design of a fixing mechanism with low assembly cost and better fastening effect for the magnetic component is an important issue of the mechanical industry.

SUMMARY OF THE INVENTION

The disclosure provides a fixing mechanism for assembling a component in a direction different from a loosing direction of a hook thereof for solving above drawbacks.

According to the disclosure, a fixing mechanism for fixing a component is disclosed. The fixing mechanism includes a base, a bottom wall disposed on the base, and two lateral walls disposed on the base and connected to the bottom wall. A containing space is formed between the base, the bottom wall, and the two lateral walls. The bottom wall and the two lateral walls abut against the component laterally when the component is contained inside the containing space. The fixing mechanism further includes at least one hook. The hook includes a cantilever portion and a hooking portion. The cantilever portion is disposed on a side of the base and connected to the bottom wall for pressing against the component in a first direction when the component is contained inside the containing space. The hooking portion is connected to the cantilever portion for engaging with a lateral surface of the component in a second direction different from the first direction as the component is placed to be contained inside the containing space in the second direction. The fixing mechanism further includes two engaging parts respectively connected to the two lateral walls and facing each other. The two engaging parts laterally engage against the component in the second direction when the component is contained inside the containing space.

These and other objectives of the disclosure will no doubt become obvious to those of ordinary skill in the art after reading the following detailed description of the embodiment that is illustrated in the various figures and drawings.

DETAILED DESCRIPTION

Figure 1:
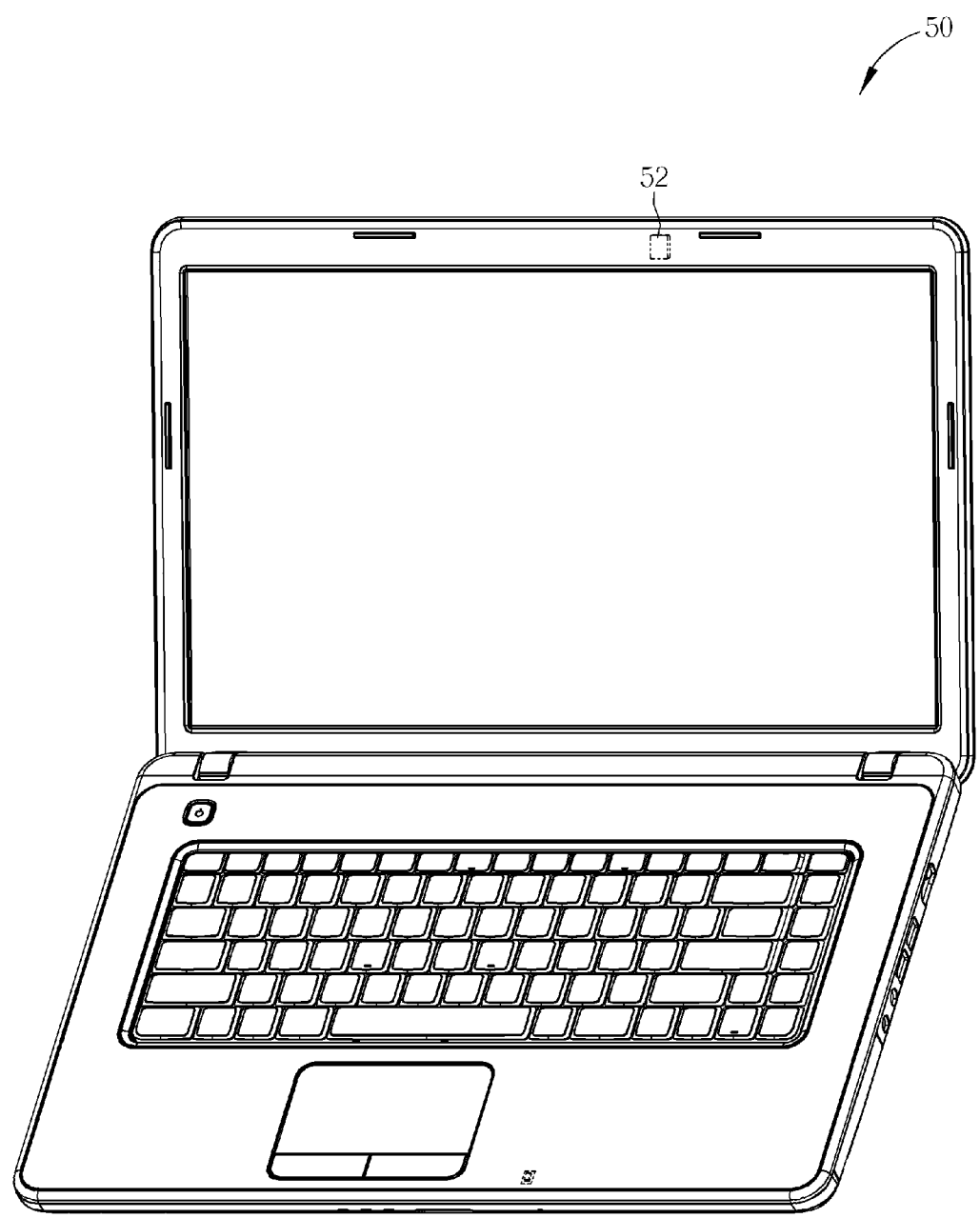
FIG. 1 and FIG. 2 are schematic drawings respectively showing a portable computer in open and close conditions according to an embodiment of the disclosure.
Figure 2:
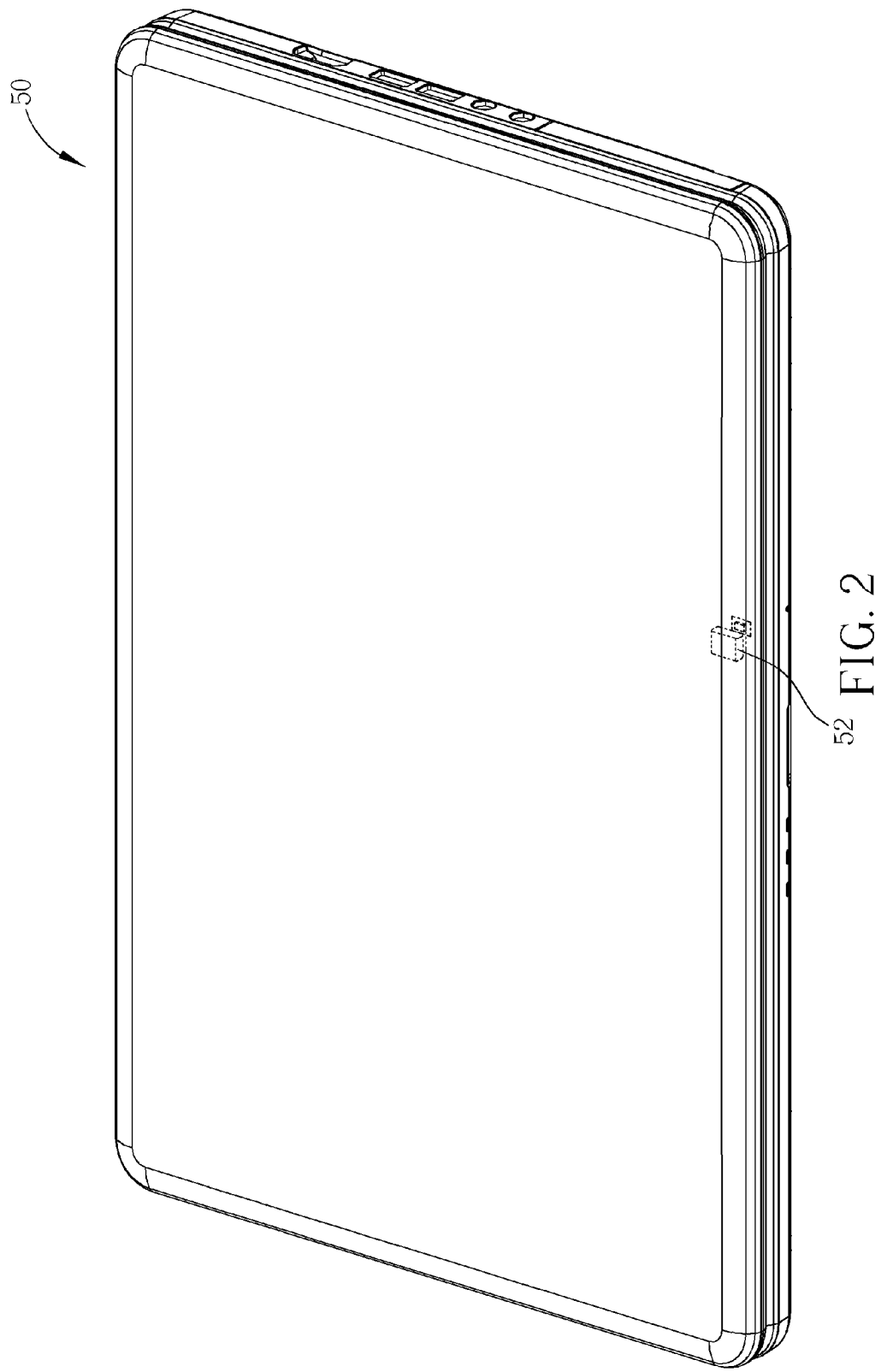
Figure 3:
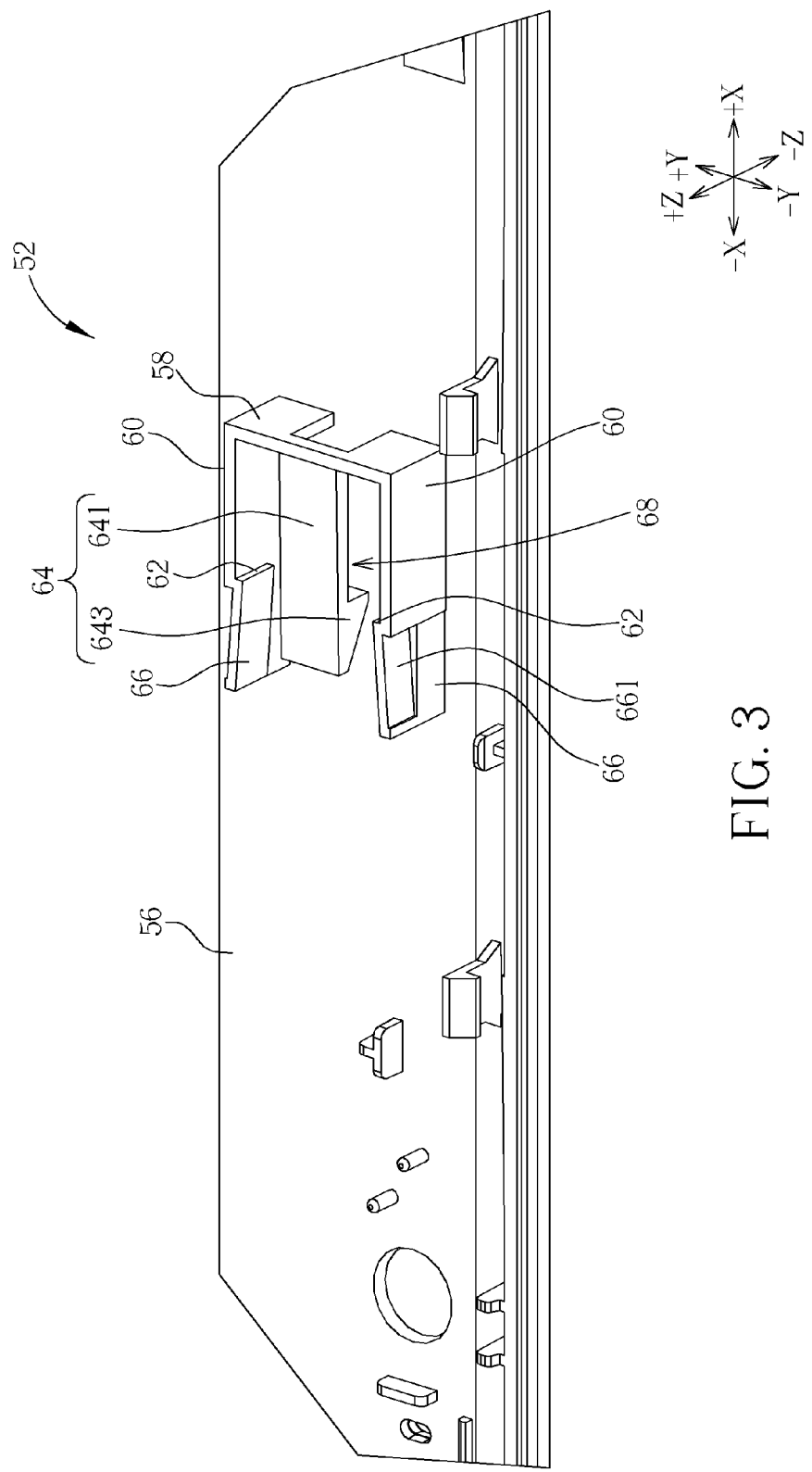
FIG. 3 is an enlarged diagram of a fixing mechanism according to the embodiment of the disclosure.
Figure 4:
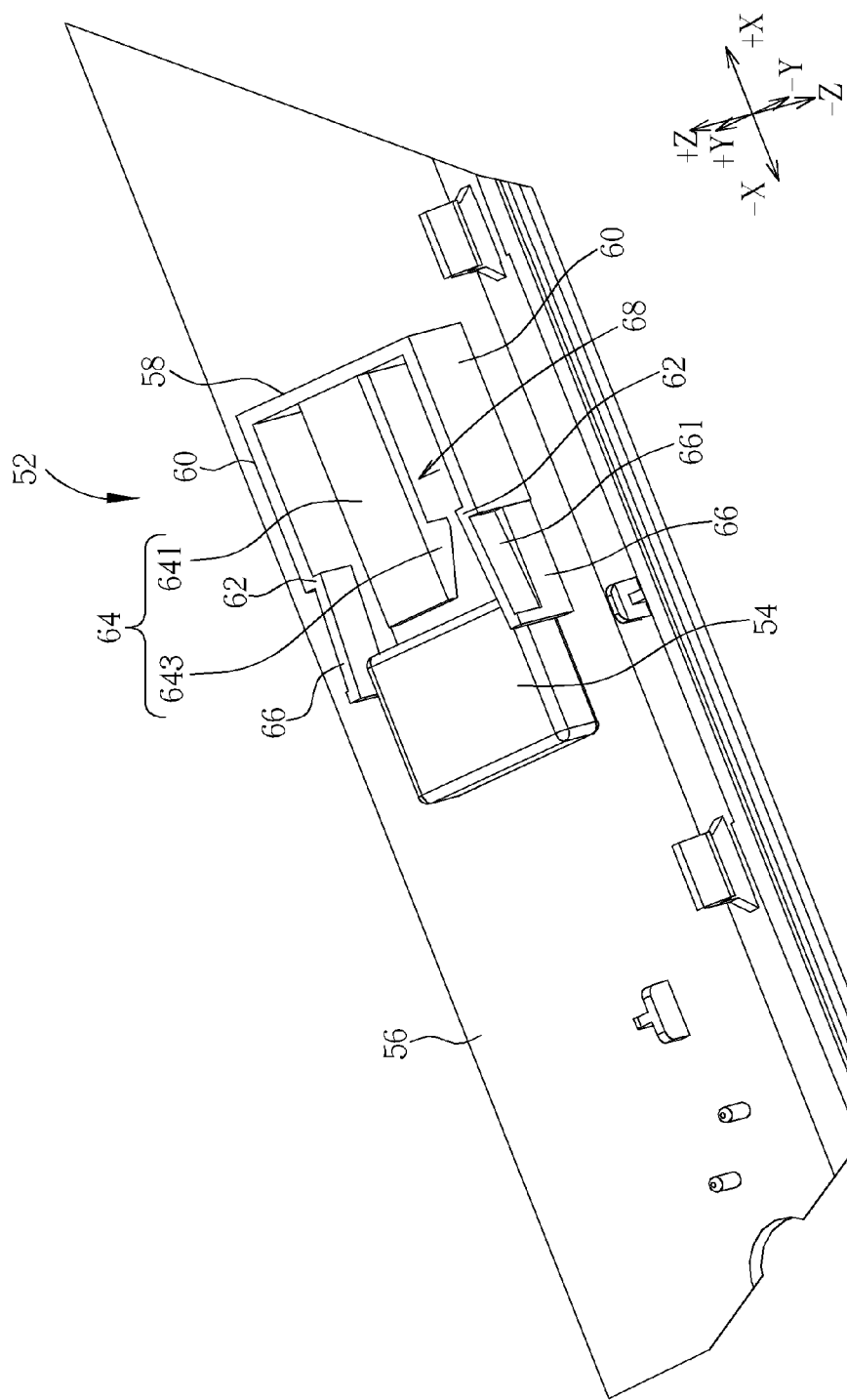
FIG. 4 to FIG. 6 are assembly diagrams illustrating the fixing mechanism fixing a component according to the embodiment of the disclosure.
Figure 5:
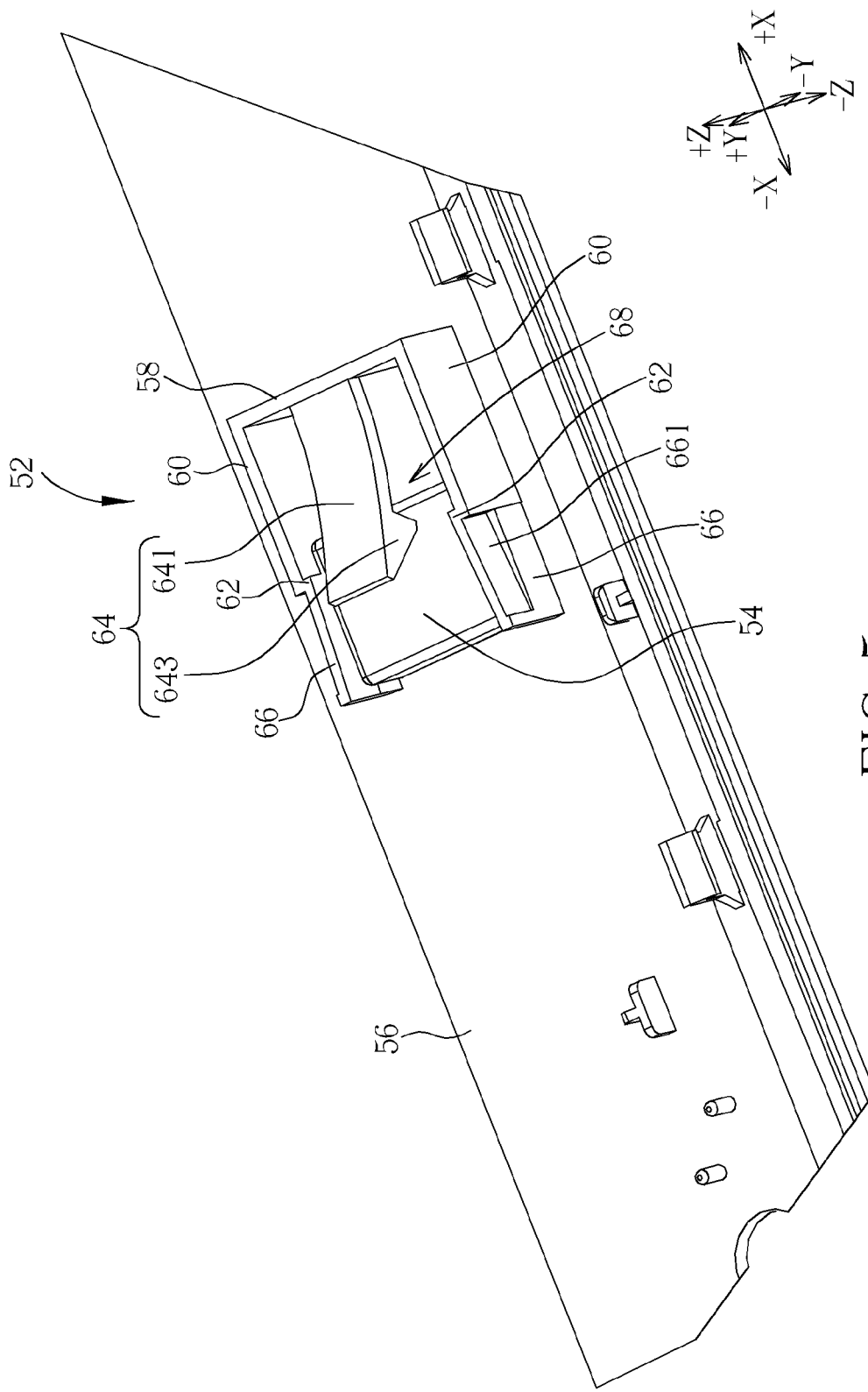
Figure 6:
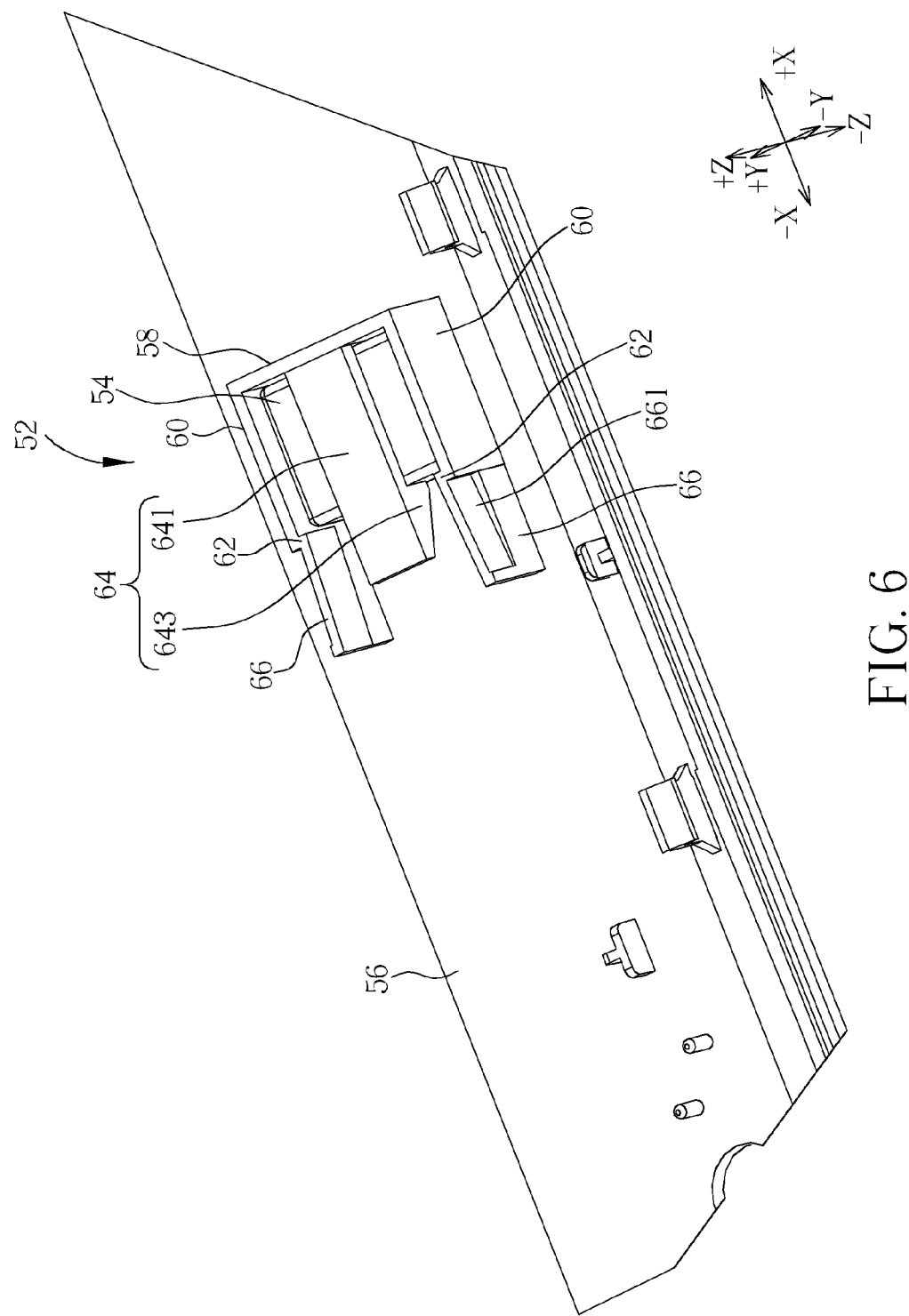

Please refer to FIG. 1 and FIG. 2. FIG. 1 and FIG. 2 are schematic drawings respectively showing a portable computer 50 in open and close conditions according to an embodiment of the disclosure. The portable computer 50 can be a notebook computer. The portable computer 50 includes a fixing mechanism 52 for fixing a component, such as a magnetic component for latching a host and a monitor with magnetic attractive force. The fixing mechanism 52 can be installed on the host or the monitor. Please refer to FIG. 3 to FIG. 6. FIG. 3 is an enlarged diagram of the fixing mechanism 52 according to the embodiment of the disclosure. FIG. 4 to FIG. 6 are assembly diagrams illustrating the fixing mechanism 52 fixing a component 54 according to the embodiment of the disclosure. The component 54 can be a magnetic component, such as a magnet. The fixing mechanism 52 includes a base 56, a bottom wall 58, two lateral walls 60, two engaging parts 62, a hook 64 and two guiding rails 66. The bottom wall 58 is disposed on the base 56. The two lateral walls 60 are disposed on the base 56 and connected to the bottom wall 58. The two engaging parts 62 are respectively connected to the two lateral walls 60 and facing each other. Each of the engaging parts 62 can be a protrusion, such as a fastening hook. The engaging parts 62 can be respectively integrated with the lateral walls 60 monolithically. A containing space 68 is formed between the base 56, the bottom wall 58, and the two lateral walls 60 for containing the component 54. The bottom wall 58 and the two lateral walls 60 abut against the component 54 laterally when the component 54 is contained inside the containing space 68.

The hook 64 includes a cantilever portion 641 and a hooking portion 643. The cantilever portion 641 is disposed on a side of the base 56 and connected to the bottom wall 58 in this embodiment. For example, the cantilever portion 641 can be integrated with the bottom wall 58 monolithically. As the component 54 is contained inside the containing space 68, the cantilever portion 641 can press down the component 54 in a first direction (−Z direction). The hooking portion 643 is connected to the cantilever portion 641 for engaging with a lateral surface of the component 54 in a second direction (+X direction) different from the first direction as the component 54 is placed to be contained inside the containing space 68 in the second direction (+X direction). An included angle between the hooking portion 643 and the cantilever portion 641 can be substantially greater than, equal to, or less than 90 degrees. The two guiding rails 66 are disposed on the base 56 and respectively connected to the engaging parts 62, for guiding the component 54 to place into the containing space 68 in the second direction (+X direction). A sunken part 661 can be formed on each guiding rail 66 for reducing bending rigidity of the guiding rail 66, so that the guiding rails 66 deform easily as being bent. A distance between two ends of the two guiding rails 66 respectively connected to the two engaging parts 62 can be less than a distance between two ends of the two guiding rails 66 away from the two engaging parts 62. That is, distances between the guiding rails 66 are gradually increasing outwardly, so that the guiding rails 66 can guide the component 54 in the second direction (+X direction) smoothly.

For fixing the component 54 with the fixing mechanism 52, the component 54 is placed between the two guiding rails 66 manually or by a jig to slide into the containing space 68 in the second direction (+X direction) as being guided by the guiding rails 66. The component 54 lifts the hook 64 upwards along an inclined surface of the hooking portion 643 of the hook 64 and pushes the engaging parts 62 outwardly when being pushed inwards along the guiding rails 66. The component 54 is contained inside the containing space 68 entirely when the component 54 is pushed inwards in +X direction to the end of the bottom wall 58, and the component 54 can not lift the hook 64 anymore so that the hook 64 recovers to an undeformed position resiliently and the hooking portion 643 engages the lateral surface of the component 54 in +X direction. Meanwhile, the unpushed engaging parts 62 also recover to an undeformed position resiliently and engage with the component 54 in the second direction (+X direction). When the component 54 is contained inside the containing space 68, the cantilever portion 641 of the hook 64 presses against the component 54 in –Z direction for preventing the component 54 from separating from the containing space 68 upwards, such as being attracted by other magnetic component in +Z direction. Besides, the assembly direction (+X direction) of the component 54 to the containing space 68 is different from the loosing direction (+Z direction) of the hook 64 lifted upwards so that the component 54 can not lift the hook 64 and the hook 64 can fasten the component 54 stably. Furthermore, the bottom wall 58, the lateral walls 60 and the engaging parts 62 can laterally abut against the component 54. That is, the bottom wall 58 laterally abuts against the component 54 in –X direction, the lateral walls 60 laterally abut against the component 54 in ±Y direction, the engaging parts 62 engage with the component 54 in +X direction, and the hooking portion 643 of the hook 64 engages with the lateral surface of the component 54 in the assembly direction (+X direction).

Furthermore, because the engaging parts 62 can fix the component 54 in +X direction, the two engaging parts 62 can constrain rotation of the component 54 around a pivot close to the bottom wall 58, such as rotation due to be attracted by other magnetic component, when the component 54 is contained inside the containing space 68. In addition, because the cantilever portion 641 of the hook 64 can press against the component 54 in –Z direction, the cantilever portion 641 of the hook 64 can constrain rotation of the component 54 around a pivot close to the engaging parts 62 when the component 54 is contained inside the containing space 68. In conclusion, the bottom wall 58, the two lateral walls 60, the two engaging parts 62 and the hook 64 can fix the component 54 inside the containing space 68 stably. As for disassembling the component 54, the hook 64 can be lifted upwards and the component 54 can be pulled out in –X direction, and the hook 64 can resiliently recover to the undeformed position after taking out the component 54.

Those skilled in the art will readily observe that numerous modifications and alterations of the device and method may be made while retaining the teachings of the invention.

What is claimed is:

1. A fixing mechanism for fixing a component, the fixing mechanism comprising:
    a base;
    a bottom wall disposed on the base;
    two lateral walls disposed on the base and connected to the bottom wall, a containing space being formed between the base, the bottom wall, and the two lateral walls, and the bottom wall and the two lateral walls abutting against the component laterally when the component is contained inside the containing space;
    a hook comprising:
        a cantilever portion disposed on a side of the base, and connected to the bottom wall for pressing against the component in a first direction when the component is contained inside the containing space; and
        a hooking portion connected to the cantilever portion for engaging with a lateral surface of the component in a second direction different from the first direction as the component is placed to be contained inside the containing space in the second direction;
    two engaging parts respectively connected to the two lateral walls and facing each other, and the two engaging parts laterally engaging against the component in the second direction when the component is contained inside the containing space; and
    two guiding rails disposed on the base and connected to the two engaging parts, respectively, for guiding the component to place into the containing space, a sunken part being formed on one of the guiding rails for reducing bending rigidity of the one of the guiding rails.

2. The fixing mechanism of claim 1, wherein the two guiding rails are respectively integrated with the two engaging parts monolithically.

3. The fixing mechanism of claim 1, wherein the cantilever portion is integrated with the bottom wall monolithically.

4. The fixing mechanism of claim 1, wherein an included angle between the hooking portion and the cantilever portion is substantially greater than, equal to, or less than 90 degrees.

5. The fixing mechanism of claim 1, wherein the two engaging parts are for constraining rotation of the component around a pivot close to the bottom wall.

6. The fixing mechanism of claim 1, wherein the cantilever portion of the hook is for constraining rotation of the component around a pivot close to the engaging parts.

7. The fixing mechanism of claim 1, wherein each of the engaging parts is a protrusion.

* * * * *